Figure 6:
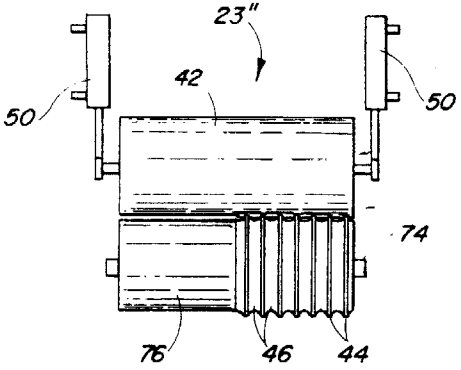
Figure 5:
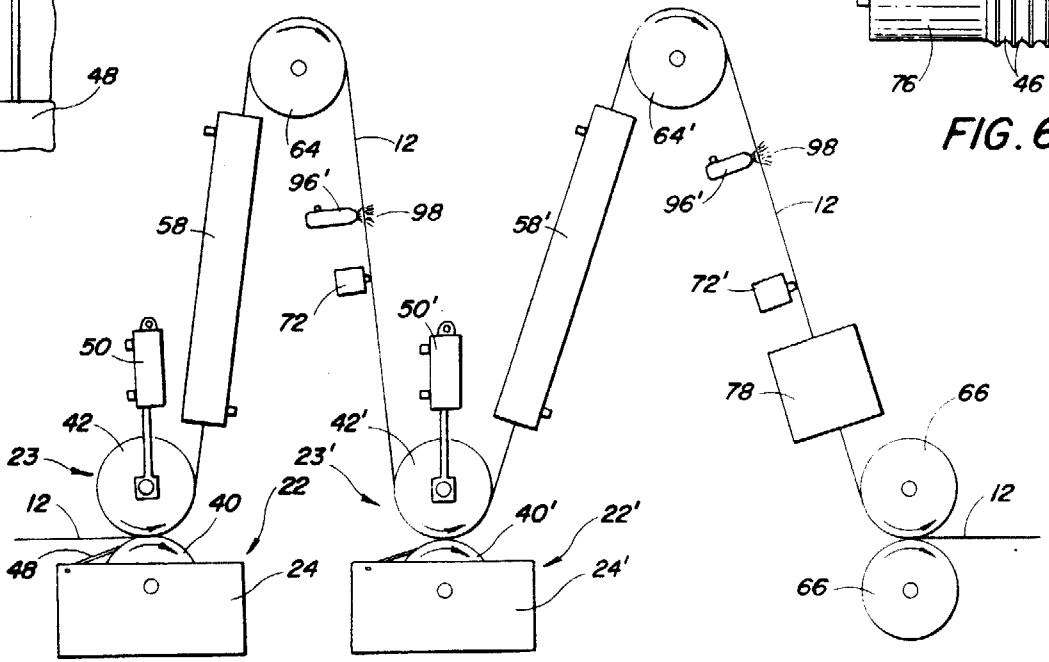
Figure 4:
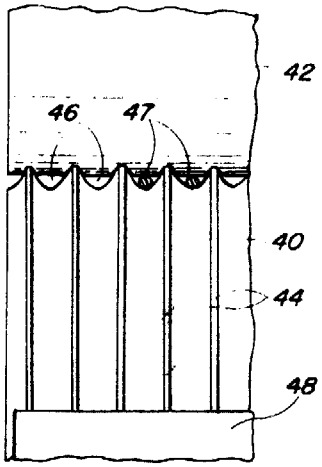
Figure 8:
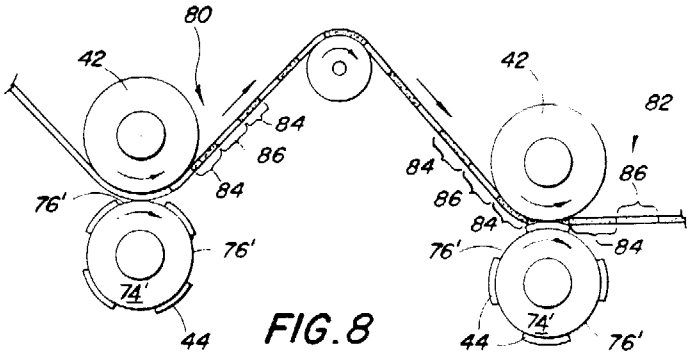
Figure 10:
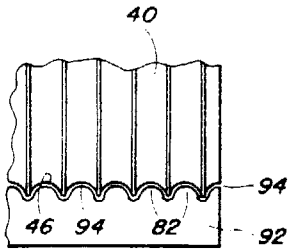
Figure 9:
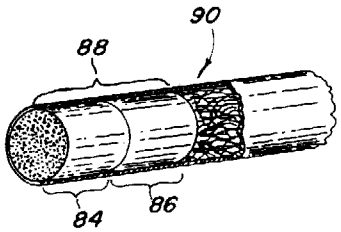
Figure 7:
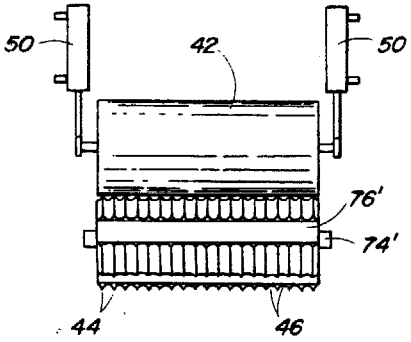
Figure 11:
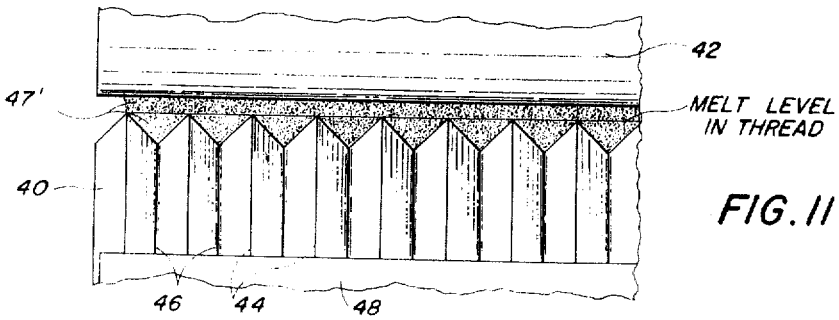
Figure 12:
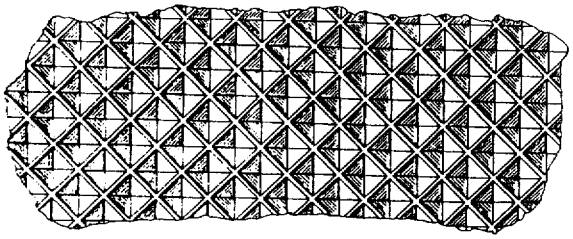
Figure 13:
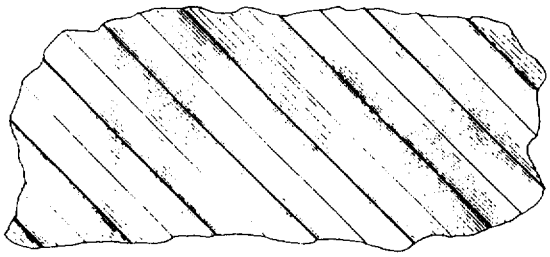
Figure 14:
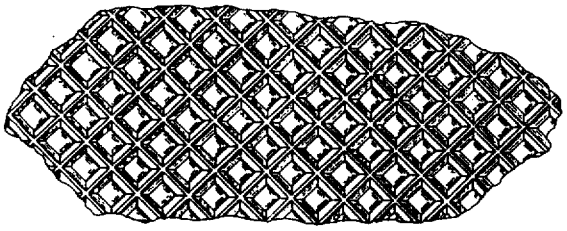

T867,001

DEFENSIVE PUBLICATION

UNITED STATES PATENT OFFICE

Published at the request of the applicant or owner in accordance with the Notice of Apr. 11, 1968, 849 O.G. 1221. Identification is by serial number of the application and the heading indicates the number of pages of specification, including claims, and of sheets of drawing contained in the application as originally filed. The file of this application is available to the public for inspection; reproduction may be purchased for 30 cents per sheet.

Applications published under the Defensive Publication Program have not been examined as to the merits of alleged invention. The Patent Office makes no assertion as to the novelty of the disclosed subject matter.

PUBLISHED OCTOBER 21, 1969

867 O.G. 747

800,819

METHOD AND APPARATUS FOR APPLYING ADDITIVES TO CIGARETTE FILTER TOW

Phara L. Cobb, Jr., P.O. Box 511, Kingsport, Tenn. 37662

Continuation of application Ser. No. 519,737, Jan. 10, 1966. This application Feb. 10, 1969. Published Oct. 21, 1969

Int. Cl. B05c *1/12, 1/08*

U.S. Cl. 156—356

4 Sheets Drawing. 23 Pages Specification

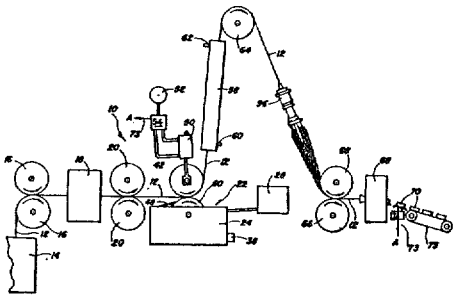

Coating apparatus for applying additives to a bloomed, moving continuous filament tow. The apparatus includes first and second rolls arranged to form a nip therebetween through which the bloomed filter tow may be passed. The first of the rolls has formed thereon additive carrying circumferential grooves for picking up and transporting quantities of the additive from a supply tank to the tow passing through the nip of the rolls. The second roll has a resilient surface and is movably mounted in respect to the first roll so that the resilient surface can be pressed into the grooves on the first roll for regulating the amount of additive being applied to the bloomed filter tow. The first roll is provided with a doctor blade positioned to ride in the circumferential grooves to remove any additive left in the groove after the additive is applied to the tow. The apparatus further has a detector for sensing and producing output signals proportional to the amount of the additive applied to the bloomed filter tow and operating means connected to the second roll to receive the signals of the detector to adjust the position of the movable second roll so that the amount of additive applied to the tow is maintained with a predetermined amount.

T867,001
800,819
DEF. PUB.
Oct. 21, 1969 P. L. COBB, JR
METHOD AND APPARATUS FOR APPLYING ADDITIVES TO CIGARETTE FILTER TOW
Original Filed Jan. 10, 1966 4 Sheets-Sheet 1
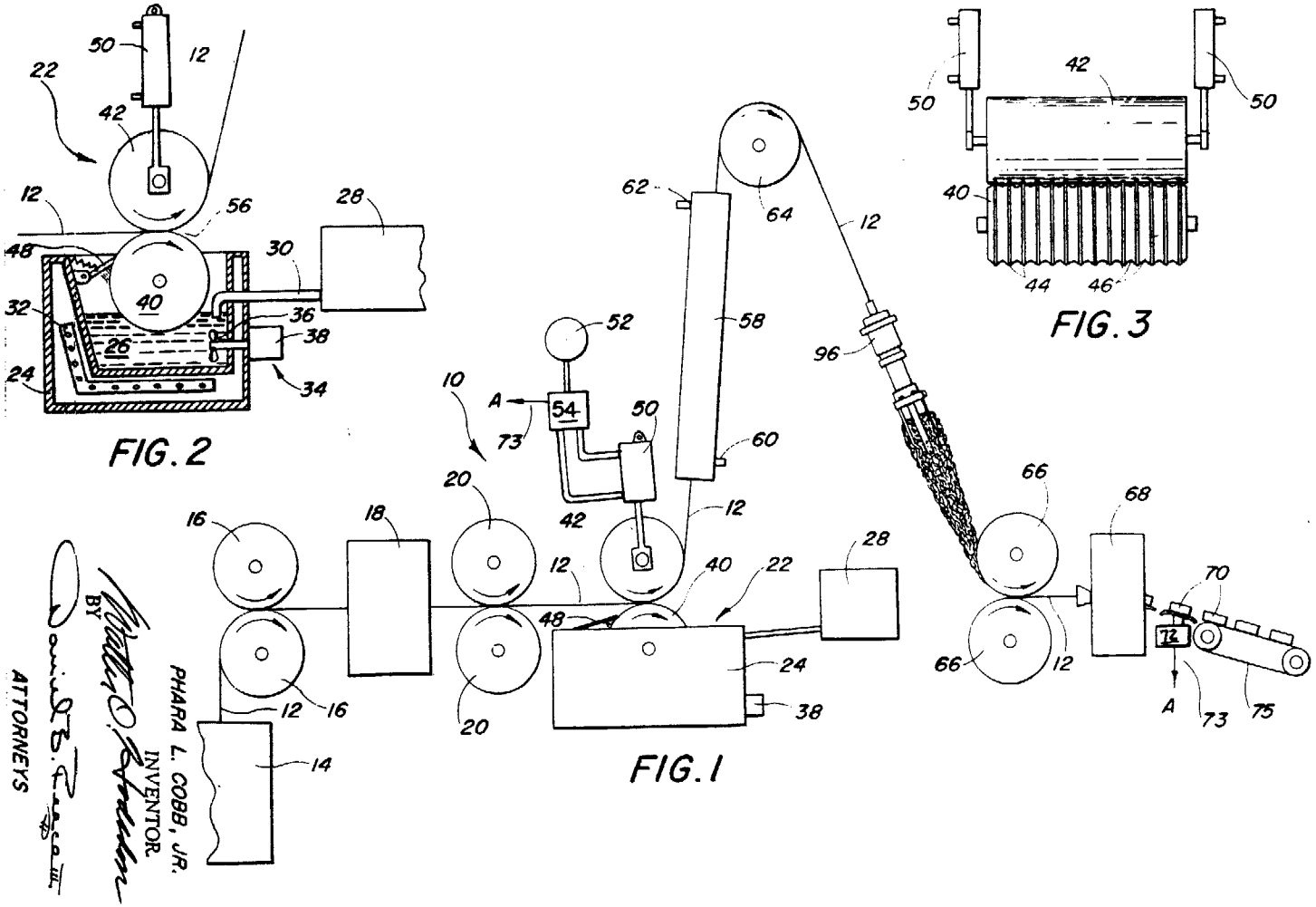
PHARA L. COBB, JR.
INVENTOR.
BY
ATTORNEYS

T867,001

800,819

DEF. PUB.

Oct. 21, 1969 P. L. COBB, JR

METHOD AND APPARATUS FOR APPLYING ADDITIVES TO CIGARETTE FILTER TOW

Original Filed Jan. 10, 1966 4 Sheets-Sheet 2

PHARA L. COBB, JR.
INVENTOR.

BY

ATTORNEYS

T 867,001

800,819
DEF. PUB.

Oct. 21, 1969 P. L. COBB, JR

METHOD AND APPARATUS FOR APPLYING ADDITIVES TO CIGARETTE FILTER TOW

Original Filed Jan. 10, 1966 4 Sheets-Sheet 3

PHARA L. COBB, JR.
INVENTOR.

BY Walter D. Hodskins
Daniel B. Ruggiero
ATTORNEYS

T 867,001

800,819
DEF. PUB.

Oct. 21, 1969

P. L. COBB, JR

METHOD AND APPARATUS FOR APPLYING ADDITIVES TO CIGARETTE FILTER TOW

Original Filed Jan. 10, 1966

4 Sheets-Sheet 4

PHARA L. COBB, JR.
INVENTOR.

BY Walter O. Holcombe
Daniel B. Reece III

ATTORNEYS